(12) United States Patent
Tun et al.

(10) Patent No.: US 8,872,790 B2
(45) Date of Patent: Oct. 28, 2014

(54) OPERATING METHOD OF CAPACITIVE TOUCH PANEL AND TOUCH CONTROL BARRIER-TYPE 3D DISPLAY DEVICE

(75) Inventors: Kyaw Kyaw Tun, Hsin-Chu (TW); Chao-Chen Wang, Hsin-Chu (TW); Chun-Huai Li, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 526 days.

(21) Appl. No.: 13/304,839

(22) Filed: Nov. 28, 2011

(65) Prior Publication Data

US 2012/0293452 A1    Nov. 22, 2012

(30) Foreign Application Priority Data

May 20, 2011    (TW) ................ 100117819 A

(51) Int. Cl.
G06F 3/045 (2006.01)
G06F 3/041 (2006.01)
G06F 3/044 (2006.01)
H04N 13/04 (2006.01)

(52) U.S. Cl.
CPC .............. G06F 3/0418 (2013.01); G06F 3/044 (2013.01); H04N 13/0409 (2013.01); H04N 13/0497 (2013.01)
USPC .......................................... 345/174; 345/173

(58) Field of Classification Search
None
See application file for complete search history.

(56) References Cited

U.S. PATENT DOCUMENTS

| | | | |
|---|---|---|---|
| 7,170,501 B2 | 1/2007 | Inamori | |
| 7,804,479 B2 | 9/2010 | Furukawa et al. | |
| 2003/0122798 A1* | 7/2003 | Shin | 345/173 |
| 2004/0217945 A1* | 11/2004 | Miyamoto et al. | 345/173 |
| 2007/0195032 A1* | 8/2007 | Lee et al. | 345/87 |
| 2010/0060610 A1* | 3/2010 | Wu | 345/174 |
| 2011/0012854 A1* | 1/2011 | Liu et al. | 345/173 |
| 2011/0260992 A1* | 10/2011 | Hung et al. | 345/173 |
| 2012/0056834 A1* | 3/2012 | Kim et al. | 345/173 |
| 2012/0146920 A1* | 6/2012 | Lin et al. | 345/173 |
| 2012/0319962 A1* | 12/2012 | Yang et al. | 345/173 |
| 2013/0021283 A1* | 1/2013 | Nishimura et al. | 345/173 |
| 2013/0222281 A1* | 8/2013 | Chen et al. | 345/173 |
| 2013/0300705 A1* | 11/2013 | Goo et al. | 345/174 |
| 2013/0308067 A1* | 11/2013 | Hashimoto | 349/15 |
| 2013/0335343 A1* | 12/2013 | Lee et al. | 345/173 |
| 2013/0335366 A1* | 12/2013 | Lee et al. | 345/174 |

FOREIGN PATENT DOCUMENTS

| | | |
|---|---|---|
| TW | M353421 | 3/2009 |
| TW | 201023129 | 6/2010 |

* cited by examiner

*Primary Examiner* — Seokyun Moon
(74) *Attorney, Agent, or Firm* — WPAT, PC; Justin King

(57) ABSTRACT

An exemplary operating method of a capacitive touch panel adapted to a touch control barrier-type three-dimensional display device and including a sensing device is disclosed. In the operating method, a sensing voltage readout operation is performed only during a signal caused by a transient of a barrier voltage is smaller than a preset value. The voltage readout operation includes steps of: providing a first driving signal to the sensing device for performing the sensing voltage readout operation during the barrier voltage is at a logic high level; and providing a second driving signal to the sensing device for performing the sensing voltage readout operation during the barrier voltage is at a logic low level. A pulse amplitude of the first driving signal is smaller than that of the second driving signal.

13 Claims, 3 Drawing Sheets

OPERATING METHOD OF CAPACITIVE TOUCH PANEL AND TOUCH CONTROL BARRIER-TYPE 3D DISPLAY DEVICE

TECHNICAL FIELD

The disclosure relates to a touch control display technology, and more particularly to an operating method of a capacitive touch panel and a touch control barrier-type 3D (three-dimensional) display device.

BACKGROUND

Touch control input device provides a new human machine interface, so that users can interact with a system more directly and friendly. Besides, by integrating a barrier-type 3D display device with a touch control input device (e.g., a capacitive touch panel), the touch control barrier-type 3D display device can provide the functions of the two devices, which are the 3D image displaying and the touch control functions.

In a conventional touch control barrier-type 3D display device, there is a touch integrated circuit (touch IC, which functions as a detecting unit) configured to perform a touch and detect process. Basically, the touch and detect process primarily includes three major operations, which are scanning, raw data processing and coordinate calculating (or touched-point coordinate determining) operations. However, because the transient of a barrier voltage level (i.e., generally barrier voltage level changing) on a barrier layer of a touch control barrier-type 3D display device may result in a certain noise (e.g., a surge noise) while the scanning operation is performed, the noise would affect the accuracy of the scanning operation, the touch IC may accordingly report or generate a wrong touched point coordinate. Moreover, it is noted that the transient of the barrier voltage would only affect the scanning operation, while the processes of raw data processing and coordinate calculating operation are immune to such transient.

Besides, in the capacitive touch control technology, the touch IC is configured to read out voltages on data readout lines right after driving lines are supplied with driving voltages, so that the touch IC can determine whether or not the touch panel is touched according to the levels of the readout voltages. However, because the level of the driving voltage is usually larger than the level of the barrier voltage when the barrier voltage is a negative voltage with respect to the grounding level, the voltage leakage is accordingly resulted in. Moreover, because the voltage leakage may drop off the voltage level on the data readout lines, the touch IC may not successfully determine whether or not the touch panel is touched if the voltages on the data readout lines are affected by the voltage leakage, so as the accuracy of the touch and detect process is affected consequently.

SUMMARY OF EMBODIMENTS

Therefore, the disclosure is to provide an operating method of a capacitive touch panel, so that the effect of the barrier voltage level changing and the issue of voltage leakage in the scanning operation can be relieved and the accuracy of the touch and detect process is improved consequently.

The disclosure is further to provide a touch control barrier-type three-dimensional (3D) display device.

Specifically, an operating method of a capacitive touch panel in accordance with an embodiment is provided. The operating method is adapted to a touch control barrier-type three-dimensional display device. The capacitive touch panel includes a sensing device. In the operating method, a sensing voltage readout operation is performed only during a signal caused by a transient of a barrier voltage is smaller than a preset value. The sensing voltage readout operation includes steps of: providing a first driving signal to the sensing device for performing the sensing voltage readout operation during the barrier voltage is at a logic high level; and providing a second driving signal to the sensing device for performing the sensing voltage readout operation during the barrier voltage is at a logic low level. Moreover, a pulse amplitude of the first driving signal is smaller than that of the second driving signal.

In one embodiment, a time period of the first driving signal at a logic high level is shorter than that of the second driving signal at a logic high level.

In one embodiment, the above mentioned operating method of a capacitive touch panel further includes a step of: performing a raw data processing operation and a touched-point coordinate determining operation on the readout sensing voltage in a time period excluding the time period of the sensing voltage readout operation being performed.

In one embodiment, the above mentioned barrier voltage is an alternating current voltage signal.

In one embodiment, the above mentioned barrier voltage has a frequency of at least 60 Hz.

A touch control barrier-type three-dimensional display device in accordance with another embodiment is provided. The touch control barrier-type three-dimensional display device includes a display panel, a barrier layer, a barrier light valve layer, a touch panel and a driving signal supplying unit. The display panel is for displaying image data. The barrier layer is for providing a barrier voltage. The barrier light valve layer is configured/arranged between the display panel and the barrier layer and has a transmittance subjected to the control of the barrier voltage. The touch panel and the barrier light valve layer are respectively configured/arranged on two opposite sides of the barrier layer. The touch panel includes a plurality of sensing devices, a plurality of driving lines, a plurality of data readout lines and a detecting unit. Each of the driving lines is for receiving a driving signal to charge the sensing devices electrically coupled with the driving line. The data readout lines are electrically coupled to the sensing devices and for transmitting sensing voltages on the respective sensing devices. The detecting unit is electrically coupled to the data readout lines and for reading out and processing the sensing voltages transmitted by the data readout lines and determining a coordinate position of a touched-point according to the processing result. The driving signal supplying unit is electrically coupled to the driving lines and for supplying the driving signal to the driving lines during a signal caused by a transient of the barrier voltage is smaller than a preset value. Herein, a pulse amplitude of the driving signal supplied to the driving lines during the barrier voltage is at logic high level, is smaller than that of the driving signal supplied to the driving lines during the barrier voltage is at logic low level.

In one embodiment, the above mentioned barrier light valve layer includes a liquid crystal layer or an electrophoretic particle layer.

In summary, by performing the sensing voltage readout operation only during a signal caused by transient of barrier voltage is smaller than a preset value, the effect/influence of the surge noise on the touch and detect process in the prior art is avoided effectively. In addition, by adopting a specific driving signal with different pulse amplitudes (i.e., generally a voltage difference between logic high and logic low levels of a pulse) aiming at the situations of the barrier voltage with different polarities to perform the scanning operation, the leakage voltage is compensated effectively. Therefore, the operating method of a capacitive touch panel and the touch control barrier-type 3D display device proposed in the disclosure have a relatively higher accuracy in the touch and detect process.

BRIEF DESCRIPTION OF THE DRAWINGS

The above objectives and advantages of the disclosure will become more readily apparent to those ordinarily skilled in the art after reviewing the following detailed description and accompanying drawing, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 1:
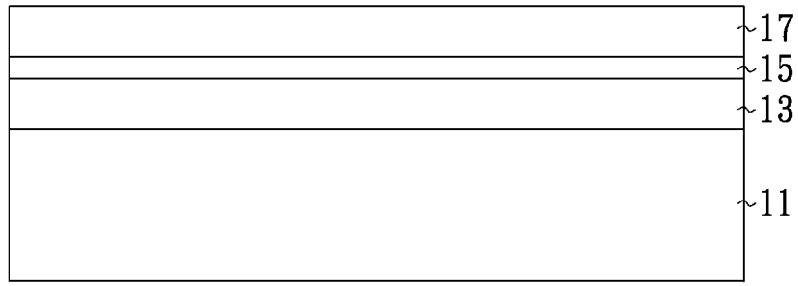
FIG. 1 is a schematic structure view of a touch control barrier-type 3D display device in accordance with an embodiment.

FIG. 1 is a schematic structure view of a touch control barrier-type 3D (three-dimensional) display device in accordance with an embodiment. The touch control barrier-type 3D display device includes a display panel 11, a barrier light valve layer 13, a barrier layer 15 and a touch panel 17. The display panel 11 (e.g., a liquid crystal display (LCD) panel or an electrophoresis-type display panel) is configured to display graphics in response to image data. The barrier layer 15 (e.g., an indium tin oxide (ITO) layer) is configured to receive and provide a barrier voltage (i.e., ±5V). The barrier light valve layer 13 (e.g., a crystal display layer or an electrophoretic particle layer) is arranged between the display panel 11 and the barrier layer 15, and a transmittance of the barrier light valve layer 13 is controlled by the barrier voltage on the barrier layer 15. The touch panel 17 (e.g., a capacitive touch panel) is arranged on a different side of the barrier layer 15 with respect to the barrier light valve layer 13.

Figure 2:
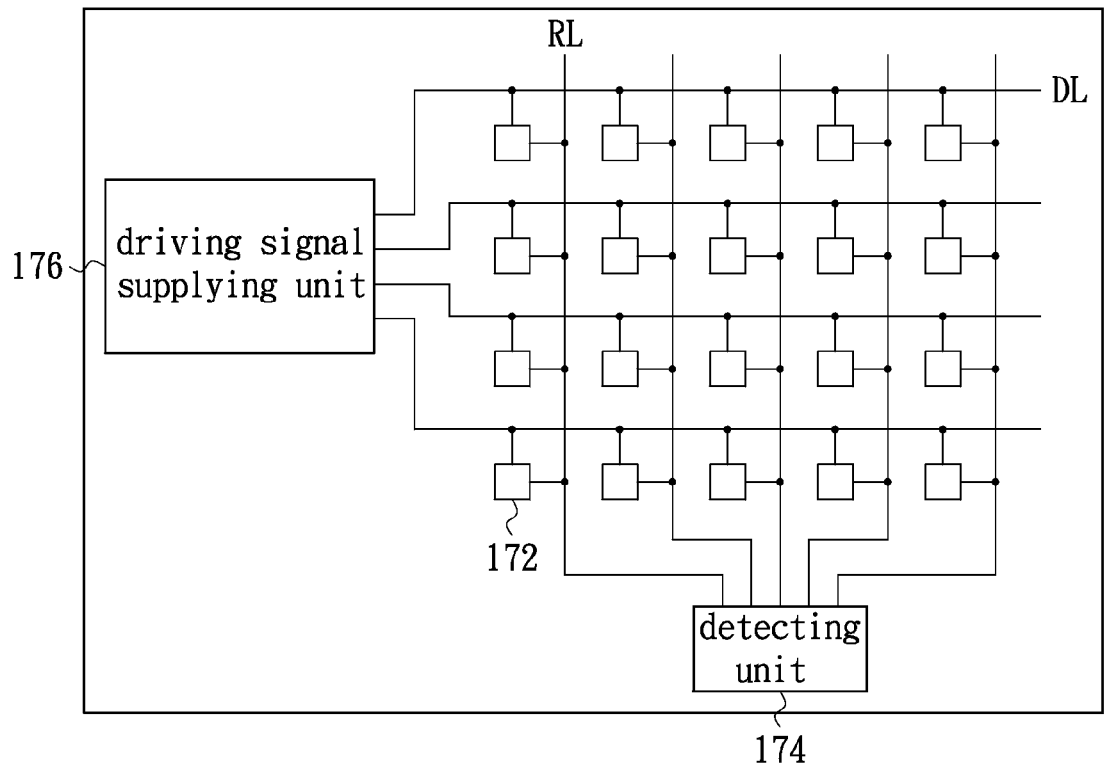
FIG. 2 is a schematic structure block diagram of a touch panel depicted in FIG. 1.

FIG. 2 is a schematic structure block diagram illustrating the touch panel 17 depicted in FIG. 1. As shown, the touch panel 17 includes a plurality of driving lines DL, a plurality of data readout lines RL, a plurality of sensing devices 172, a detecting unit 174 and a driving signal supplying unit 176. The driving signal supplying unit 176 is electrically coupled to the driving lines DL and configured to sequentially supply a driving signal to the driving lines DL, which are arranged crossing/intersecting with the data readout lines RL. Each of the sensing devices 172 is electrically coupled to its corresponding driving line DL and corresponding data readout line RL. Each of the driving lines DL is used for receiving the driving signal from the driving signal supplying unit 176 and charging the electrically-coupled sensing devices 172 by the driving signal. Each of the data readout lines RL is used for transmitting sensing voltages on the electrically-coupled sensing devices 172 to the detecting unit 174. The detecting unit 174 is electrically coupled to the data readout lines RL and configured to read out and process the sensing voltages on the data readout lines RL, and consequently determine a coordinate position of a touched-point according to the result of the processing.

Figure 3:
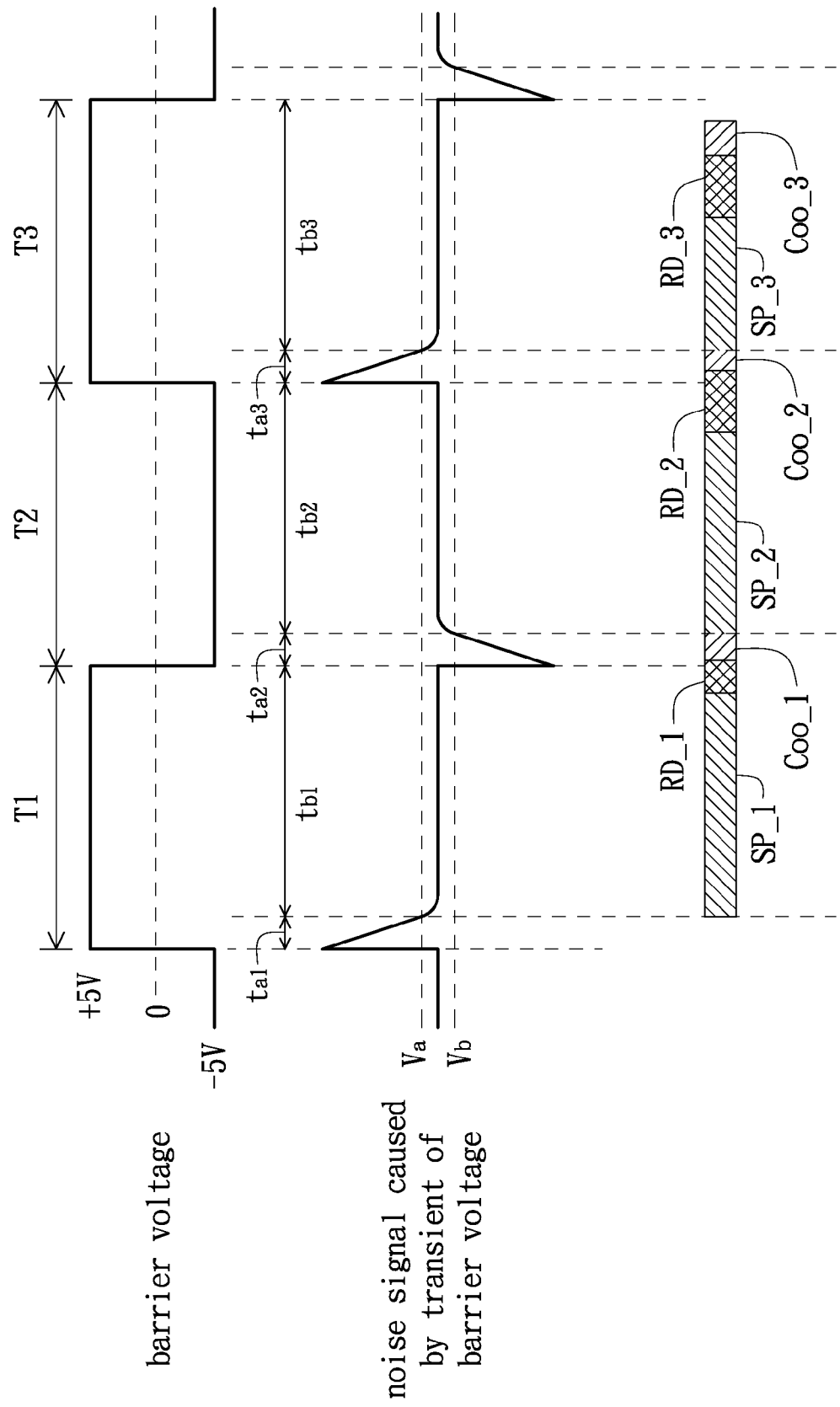
FIG. 3 is a schematic waveform chart of a barrier voltage and a noise signal caused by transient of the barrier voltage and a corresponding touch and detect process, in an operating method of a capacitive touch panel in accordance with an embodiment.

FIG. 3 is a schematic waveform chart of a barrier voltage and a noise signal caused by transient of the barrier voltage and a corresponding touch and detect process, in an operating method of a capacitive touch panel in accordance with an embodiment. In the embodiment, the touch and detect process primarily includes three major operations, which are scanning, raw data processing and coordinate calculating operations, and the touch panel 17 is assumed to complete one cycle of the touch and detect process on all the driving lines DL in time-period T1~T3. Besides, in the following description of the embodiment, we only concern about the amplitudes of the noise signal and an associated preset signal, which means the polarities of the above-mentioned signals are not a consideration here.

As depicted in FIG. 3, (1) In time-period T1 (indicating a specific time period after the barrier voltage converted from a logic low level (i.e., −5 v) to a logic high level (i.e., +5 v)): In sub time-period $t_{a1}$, because the amplitude of the noise signal caused by the transient of the barrier voltage is larger than a preset value Va, the scanning operation of the touch and detect process is not to be performed. In sub time-period $t_{b1}$, because the amplitude of the noise signal is smaller than the preset value Va, the scanning operation SP_1 is performed; that is, the driving signal supplying unit 176 sequentially supplies a first driving signal to a specific portion of the driving lines DL for driving the electrically-coupled sensing devices 172 to perform the sensing voltage readout operation; in addition, because the amplitude of the noise signal is smaller than the preset value Va in sub time-period $t_{b1}$, the effect of the noise signal on the sensing voltage or on the result of the sensing voltage readout operation can be ignored or inconsiderable. Then, the raw data processing operation RD_1 is consequently performed once the scanning operation SP_1 is completed.

(2) In time-period T2 (indicating a specific time period after the barrier voltage converted from a logic high level (i.e., +5 v) to a logic low level (i.e., −5 v)): In sub time-period $t_{a2}$, because the amplitude of the noise signal is larger than a preset value $V_b$, the scanning operation is not to be performed so the raw data processing operation RD_1 is kept being performed; in addition, the coordinate calculating operation Coo_1 is performed consequently once the raw data processing operation RD_1 is completed. In sub time-period $t_{b2}$, because the amplitude of the noise signal is smaller than the preset value $V_b$, the scanning operation SP_2, which is an extension of the scanning operation SP_1, is to be performed; that is, the driving signal supplying unit 176 sequentially supplied a second driving signal, having a different pulse amplitude with respect to the first driving signal, to another portion of the driving lines DL for driving the electrically-coupled sensing devices 172 to perform the sensing voltage readout operation. Then, the raw data processing operation RD_2, which is an extension of the raw data processing operation RD_1, is sequentially performed once the scanning operation SP_2 is completed.

(3) In time-period T3 (indicating a specific time period after the barrier voltage converted from a logic low level (i.e., −5 v) to a logic high level (i.e., +5 v)): In sub time-period $t_{a3}$, because the amplitude of the noise signal is larger than the preset value $V_a$, the scanning operation is not to be performed so the raw data processing operation RD_2 is kept being performed; in addition, the coordinate calculating operation Coo_2 is performed consequently once the raw data processing operation RD_2 is completed. In sub time-period $t_{b3}$, because the amplitude of the noise signal is smaller than the preset value $V_a$, the scanning operation SP_3, which is an extension of the scanning operation SP_2, is to be performed; that is, the driving signal supplying unit 176 sequentially supplies the first driving signal to the rest portion of the driving lines DL for driving the electrically-coupled sensing devices 172 to perform the sensing voltage readout operation. After the scanning operation SP_3 is completed, the raw data process RD_3, which is an extension of the raw data processing operation RD_2, and the coordinate calculating operation Coo_3, which is an extension of the coordinate calculating operation Coo_2, are sequentially performed. Once the coordinate calculating operation Coo_3 is completed, one cycle of the touch and detect process, including the scanning, raw data processing and coordinate calculating operations, on all driving lines DL of the touch panel 17 is completed.

To sum up, in the operating method of a capacitive touch panel in accordance with an embodiment, the sensing voltage readout operation (in the scanning operation) is performed only during the noise signal caused by the transient of the barrier voltage is smaller than a preset value. That is, when the noise signal is smaller than a preset value, a first driving signal (at a logic high level with respect to a barrier voltage) or a second driving signal (at a logic low level with respect to a barrier voltage), are alternatively supplied to the driving lines DL based on the levels of the barrier voltage. The raw data processing and the coordinate calculating operations are performed on the readout sensing voltage in other time periods, such as the time period without performing the scanning operation or the time period of the noise signal having amplitude greater than the preset value. Because the sensing voltage readout operation is performed only during the noise signal is smaller than a preset value in the embodiment, the effect of the noise (surge noise), caused by the transient of the barrier voltage, on the touch and detect process of the touch panel 17 is minimized so that the accuracy in the touch and detect process in the embodiment is improved consequently.

Figure 4A:
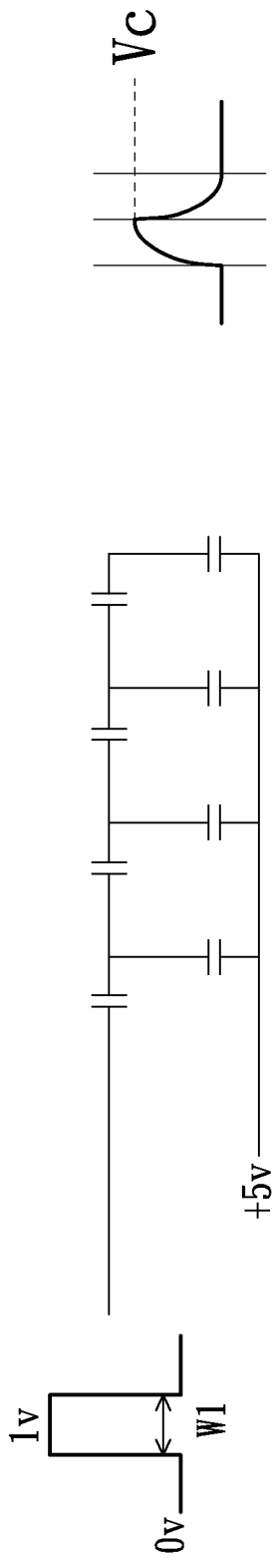
FIG. 4A is a schematic waveform of a first driving signal, an equivalent circuit of a single one data readout line and a resulting charging-discharging waveform of a sensing device, in accordance with an embodiment.
Figure 4B:
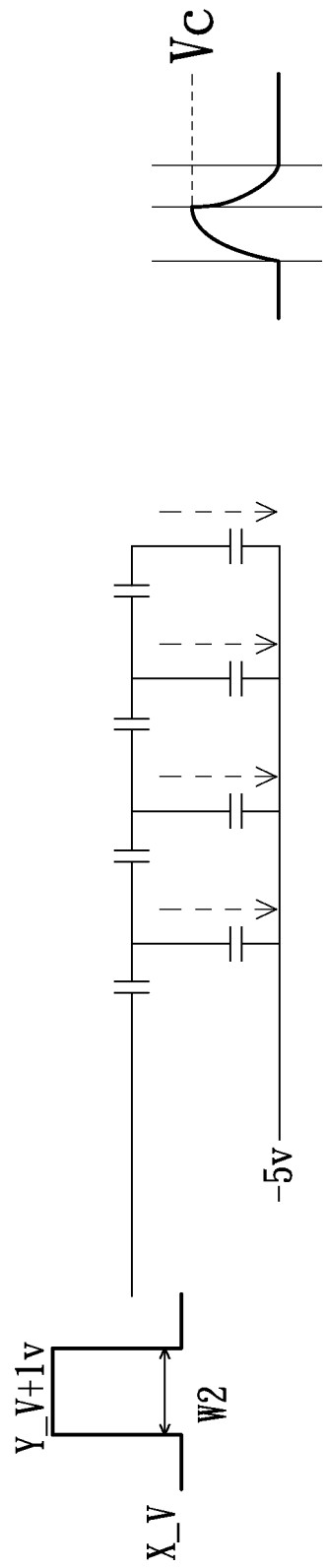
FIG. 4B is a schematic waveform of a second driving signal, an equivalent circuit of a single one data readout line and a resulting charging-discharging waveform of a sensing device, in accordance with an embodiment.

Please refer to FIGS. 1, 2, 4A and 4B together. Herein, FIG. 4A is a schematic waveform of a first driving signal, an equivalent circuit of a single one data readout line RL and a resulting charging-discharging waveform of a sensing device 172, in accordance with an embodiment; and FIG. 4B is a schematic waveform of a second driving signal, an equivalent circuit of a single one data readout line RL and a resulting charging-discharging waveform of a sensing device 172, in accordance with an embodiment.

As depicted in FIG. 4A, when the barrier voltage is at a logic high level (i.e., +5 v) thereby having a normal-value voltage difference (between the barrier layer (with a barrier voltage of +5 v) and the data readout line RL), the first driving signal in the embodiment is configured to have a logic high level of +1 v and a logic low level of 0 v, so that the pulse amplitude, or the voltage difference between the logic high and logic low levels, of the first driving signal is (1 v−0 v)=1 v. Besides, the pulse width of the first driving signal at a high logic level is configured to W1, as depicted in FIG. 4A. Once the first driving signal is supplied from the driving signal supplying unit 176 to the driving line DL, the charging/discharging operations are accordingly performed on the electrically-coupled sensing device 172. That is, when the first driving signal is at the logic high of 1 v, the voltage on the electrically-coupled sensing device 172 is charged to a specific value (i.e., Vc); when the first driving signal is at the logic low of 0 v, the sensing voltage readout operation is performed on the sensing device 172 through performing a discharging operation on a corresponding data readout line RL.

As depicted in FIG. 4B, when the barrier voltage is at a logic low level (i.e., −5 v) thereby having a negative-value voltage difference (between the barrier layer (with a barrier voltage of −5 v) and the data readout line RL), the touch panel 17 may result in the voltage leakage. In this situation, still configuring the logic high level of the second driving signal to 1 v, as previously done to the first driving signal, may lead to the voltage on the charged sensing device 172 is not sufficient enough for the detecting unit 174 to distinguish whether or not the sensing device 172 is touched. Therefore, in order to compensate the voltage leakage, the logic high and logic low levels of the second driving signal in the embodiment are modified to (Y_V+1 v) and X_V, respectively; here, Y_V is greater than X_V, Y_V and X_V is a positive value. By this modification, the second driving signal has a pulse amplitude (or a voltage difference between the logic high and logic low levels) of [(Y_V+1 v)−X_V]>1 v, which is greater than that of the first driving signal. Additionally, as depicted in FIG. 4B, the pulse width of the second driving signal at a high logic level may be configured to W2, which is also greater than W1 of the first driving signal. Through this configuration, the second driving signal accordingly has a relative large pulse amplitude and pulse width with respect to the first driving signal, so that the voltage on the sensing device 172 still can be charged by the second driving signal to a sufficient value if the barrier voltage is at a logic low level. As depicted in FIG. 4B, once the second driving signal is supplied, the voltage on the electrically-coupled sensing device 172 is charged to a specific value (i.e., Vc) when the second driving signal is at the logic high of (Y_V+1 v); the sensing device 172 performs the sensing voltage readout operation through a corresponding data readout line RL performing a discharging operation when the second driving signal is at the logic high of Y_V.

To sum up, by adopting a specific driving signal with different pulse amplitudes and/or different pulse widths aiming at the situations of the barrier voltage with different polarities to perform the scanning operation, the leakage voltage is compensated effectively. Therefore, the operating method of a capacitive touch panel and the touch control barrier-type 3D display device proposed in the disclosure have a relatively higher accuracy in the touch and detect process.

Moreover, the barrier voltage in the embodiment can be an alternating current voltage signal with a frequency of at least 60 Hz.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An operating method of a capacitive touch panel adapted to a barrier-type three-dimensional display device, the capacitive touch panel comprising a sensing device, the operating method comprising:

performing a sensing voltage readout operation only during a signal caused by a transient of a barrier voltage is smaller than a preset value; the sensing voltage readout operation comprising:
  providing a first driving signal to the sensing device for performing the sensing voltage readout operation when the barrier voltage is at a logic high level; and
  providing a second driving signal to the sensing device for performing the sensing voltage readout operation when the barrier voltage is at a logic low level,
wherein a pulse amplitude of the first driving signal is smaller than that of the second driving signal.

2. The operating method of a capacitive touch panel according to claim 1, wherein a time period of the first driving signal at a logic high level is shorter than that of the second driving signal at a logic high level.

3. The operating method of a capacitive touch panel according to claim 2, further comprising:
  performing a raw data processing operation and a touched-point coordinate determining operation on a readout voltage in a time period excluding the time period of the sensing voltage readout operation being performed.

4. The operating method of a capacitive touch panel according to claim 1, further comprising:
  performing a raw data processing operation and a touched-point coordinate determining operation on a readout sensing voltage in a time period excluding the time period of the voltage readout operation being performed.

5. The operating method of a capacitive touch panel according to claim 1, wherein the barrier voltage is an alternating current voltage signal.

6. The operating method of a capacitive touch panel according to claim 1, wherein a frequency of the barrier voltage is at least 60 Hz.

7. A touch control barrier-type three-dimensional display device, comprising:
  a display panel, for displaying image data;
  a barrier layer, for providing a barrier voltage;
  a barrier light valve layer arranged between the display panel and the barrier layer, wherein a transmittance of the barrier light valve layer is controlled by the barrier voltage;
  a touch panel, arranged on a different side of the barrier layer with respect to the barrier light valve layer, comprising:
    a plurality of sensing devices;
    a plurality of driving lines, wherein each of the driving lines is for receiving a driving signal to charge the sensing devices electrically coupled with the driving line;
    a plurality of data readout lines, electrically coupled to the sensing devices, for transmitting sensing voltages on the respective sensing devices; and
    a detecting unit, electrically coupled to the data readout lines, for reading out and processing the sensing voltages transmitted by the respective data readout lines and determining a coordinate position of a touched-point according to the result of the processing; and
  a driving signal supplying unit, electrically coupled to the driving lines, for supplying the driving signal to the driving lines during a signal caused by a transient of the barrier voltage is smaller than a preset value, wherein a pulse amplitude of the driving signal supplied by the driving signal supply unit during the barrier voltage is at a logic high level is smaller than that of the driving signal supplied by the driving signal supply unit during the barrier voltage is at a logic low level.

8. The touch control barrier-type three-dimensional display device according to claim 7, wherein a time period of the driving signal at a logic high level supplied by the driving signal supplying unit during the barrier voltage is at the logic high level, is smaller than that of the driving signal at a logic high level supplied by the driving signal supplying unit during the barrier voltage is at the logic low level.

9. The touch control barrier-type three-dimensional display device according to claim 8, wherein the detecting unit is further for performing a raw data processing operation and a touched-point coordinate determining operation on the readout sensing voltages in a time period excluding the time period of reading out the sensing voltages transmitted by the respective data readout lines.

10. The touch control barrier-type three-dimensional display device according to claim 7, wherein the detecting unit is further for performing a raw data processing operation and a touched-point coordinate determining operation on the readout sensing voltages in a time period excluding the time period of reading out the sensing voltages transmitted by the respective data readout lines.

11. The touch control barrier-type three-dimensional display device according to claim 7, wherein the barrier light valve layer is a liquid crystal layer or an electrophoretic particle layer.

12. The touch control barrier-type three-dimensional display device according to claim 7, wherein the barrier voltage is an alternating current voltage signal.

13. The touch control barrier-type three-dimensional display device according to claim 7, wherein a frequency of the barrier voltage is at least 60 Hz.

* * * * *